Oct. 31, 1961 W. HERRIOTT 3,006,234
ELECTRO-OPTICAL SYSTEM
Filed Nov. 8, 1947 2 Sheets-Sheet 1
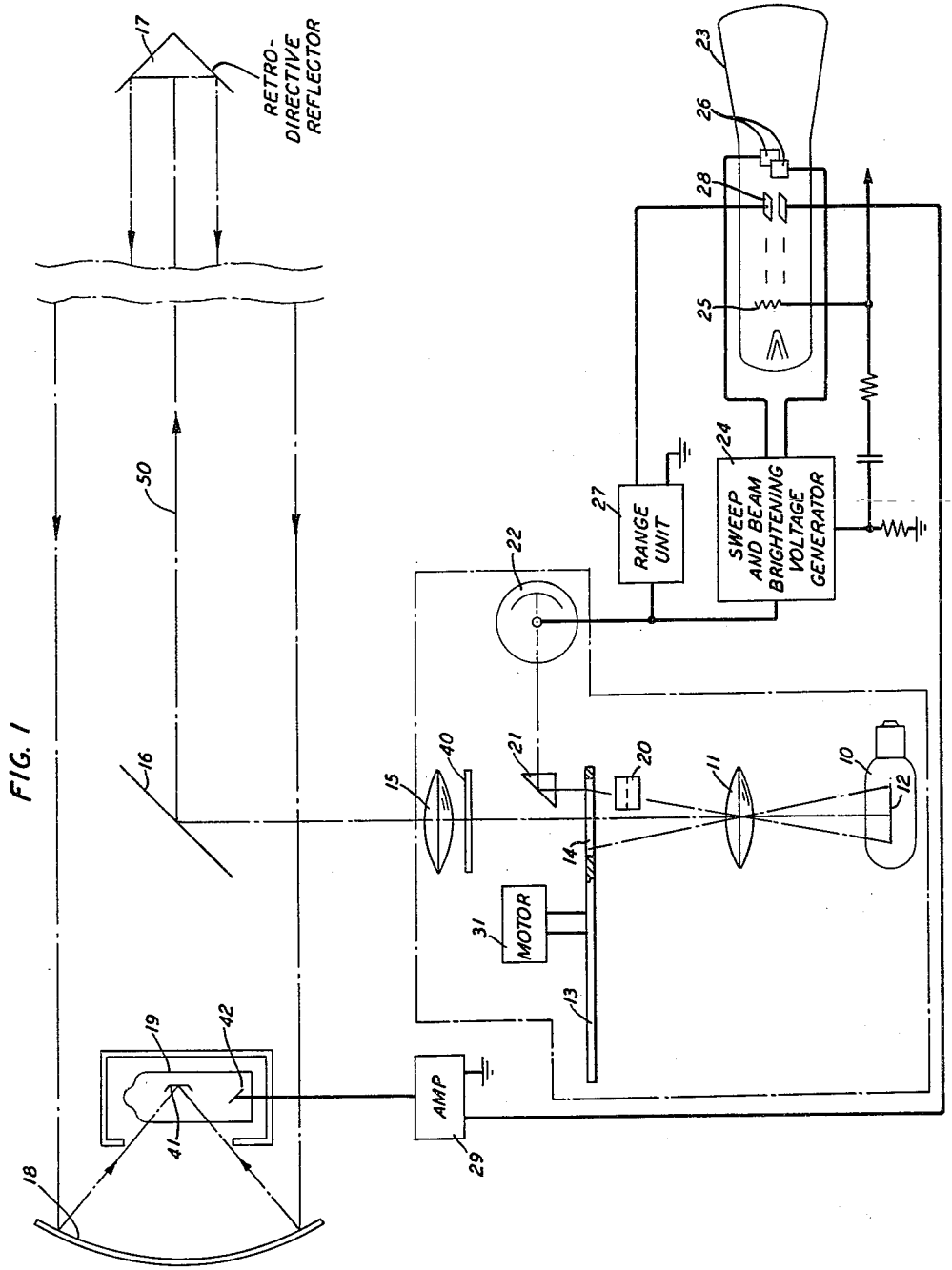
INVENTOR
W. HERRIOTT
BY
Hugh S. Wertz
ATTORNEY

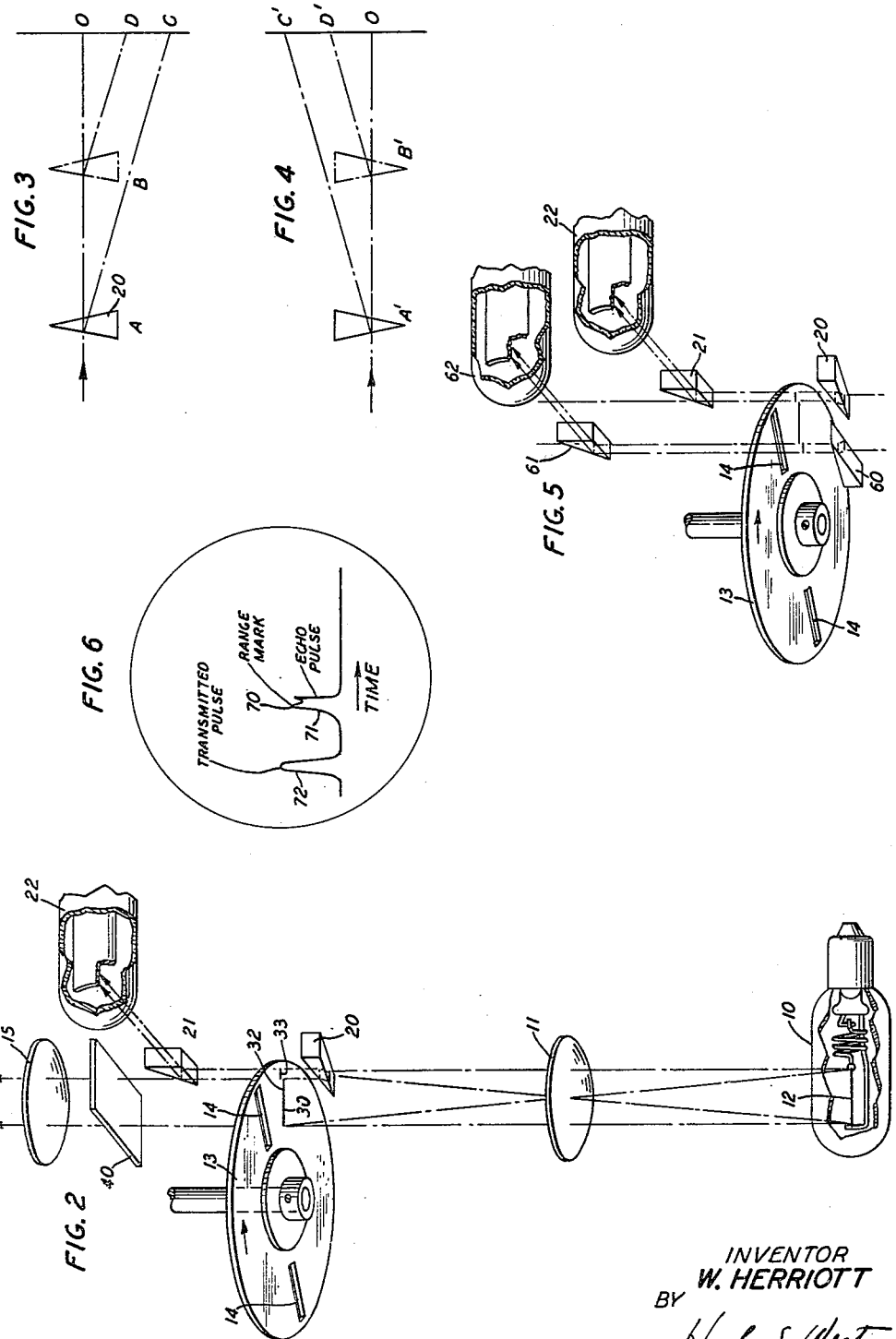

United States Patent Office 3,006,234
Patented Oct. 31, 1961

3,006,234
ELECTRO-OPTICAL SYSTEM
William Herriott, Chatham, N.J., assignor to Bell Telephone Laboratories, Incorporated, New York, N.Y., a corporation of New York
Filed Nov. 8, 1947, Ser. No. 784,925
10 Claims. (Cl. 88—1)

This invention relates to electro-optical systems and more specifically to object locating and distance measuring systems employing light.

The term "light," as used herein, is intended to be descriptive of radiation in both the visible and invisible portions of the spectrum.

In a copending application of E. Bruce, Serial No. 775,685 filed September 23, 1947, now U.S. Patent No. 2,970,310, there is disclosed an object locating and distance measuring system employing light waves, preferably infra-red light rays. In the arrangement described in the Bruce application, a light pulse from a flash lamp is reflected by a paraboloidal mirror directed toward a target (which is preferably a retrodirective reflector), and echoes or reflections therefrom are picked up by a receiver optical system and applied to a photomultiplier. The amplified output of the photomultiplier is applied to the vertical deflecting plates of a cathode ray oscilloscope to the horizontal deflecting plates of which is applied a timing sweep wave initiated by a synchronizing pulse produced at the same time as the light pulse. This synchronizing pulse is also utilized to produce a range mark of known time delay for indicating distance to the target. The present invention is concerned with an electro-optical system of the same general type as that disclosed in the Bruce application but which utilizes instead of a flash lamp a constantly emitting light source.

It is an object of this invention to utilize a constantly emitting tungsten light source to produce light pulses for object locating and distance measuring systems.

It is another object of this invention to produce by refractive optical means a synchronizing pulse just preceding (or following) each pulse of light directed to the target of an object locating distance measuring system.

Other objects and features of the invention will be apparent as the description proceeds.

In a specific illustrative embodiment of the invention, infra-red light rays are used. A continuous beam of these rays is produced by a constantly emitting tungsten light source having a narrow, line-like filament and this source is associated with a moving optical system for generating an electrical pulse leading the transmission of an infra-red pulse which is reflected by a mirror and directed toward a target, preferably a retrodirective reflector. Reflections of the target are picked up by a receiver optical system and applied to a photomultiplier. The outgoing light pulses are produced by rotating a disc or wheel having a narrow slit or slits therein in the plane of an image of the tungsten source formed by a suitable lens or lens system.

A relatively weak non-achromatic prism is introduced into a portion of the light beam at a point near the slit wheel and by refraction forms a displaced segment of the main image which is intercepted by the moving slit slightly ahead of or behind the main image depending upon the orientation of the prism. The light entering into the formation of the displaced portion of the image after passing through the moving slit is directed by means of a right angle total reflecting prism and a lens to the cathode of a photocell which generates a synchronizing pulse which can be used for triggering a sweep circuit in an oscilloscope forming a part of the system. The amplified output of the photomultiplier receiving the rays returned by the distant target is applied to the vertical deflecting plates of the cathode ray oscilloscope and the time sweep wave initiated by the synchronizing pulse is applied to the horizontal deflecting plates.

As a modification, a multiplicity of weak prisms can be employed for the purpose of securing more than one pulse which may precede or follow the main pulse at equal or unequal time intervals. By way of example, one prism can be placed at the lower end of the undisplaced image of the lamp in the plane of the scanning disc and the second prism placed in the path of the rays forming the upper end of its undisplaced image.

The invention will be more readily understood by referring to the following description taken in connection with the accompanying drawings forming a part thereof in which:

FIG. 1 is a schematic diagram of an object locating and distance measuring system employing light radiation and utilizing an electro-optical arrangement in accordance with the invention for producing light pulses;

FIG. 2 is a perspective view of a portion of the system shown in FIG. 1;

FIGS. 3 and 4 are diagrammatic representations to aid in understanding the invention;

FIG. 5 is a perspective view of a portion of a modified electro-optical system; and FIG. 6 illustrates on the screen of a cathode ray oscilloscope an echo pulse and a range mark pulse.

Referring more specifically to the drawings, FIG. 1 shows by way of example for purposes of illustration, an object locating and distance measuring system employing visible or invisible light rays. When infra-red light is used, the system is frequently called an "irrad." The optical system for the main beam comprises a constantly emitting tungsten lamp 10 which produces radiation in both the visible and invisible portions of the spectrum, a lens system represented by the single lens 11 for focussing an image of the narrow straight filament 12 of the lamp 10 on the plane of a rotating disc 13, an optical system comprising a lens system 15 and mirror 16 for directing radiation from the lamp 10 upon a target 17 (shown as a retrodirective reflector) which returns some of this radiation to a receiver optical system, comprising the paraboloidal mirror 18, which focuses the received radiation upon the cathode of a photomultiplier 19 which produces an electrical pulse utilized for determining the range of the target. The optical system also includes means for producing a "preknock" synchronizing pulse by means of light passing through the prism 20, the moving slit 14 in the disc 13, and the right angle prism 21 and incident upon a photocell 22, thus producing an electrical synchronizing pulse. The pulse produced in the photocell 22 is applied to a sweep and beam brightening voltage generator 24 to initiate a time sweep in the tube 23 and also to produce a voltage which can be applied to the control element 25 of the tube 23 to "unblank" the blocked off beam for the duration of the sweep. A suitable sweep and beam brightening (unblanking) circuit is disclosed in an application filed by B. M. Oliver on November 1, 1944, Serial No. 561,410. The sweep circuit output is applied to the pair of horizontal deflecting plates 26. The synchronizing pulse produced in the photocell 22 is also applied to a range unit 27 to produce a range mark pulse of known time delay which is applied to one of the pair of deflecting plates 28. The output circuits of the amplifier 29 receiving the output of the photomultiplier 19 and of the range unit 27 and the pair of deflecting plates 28 are connected in a series circuit so that the range mark pulse optionally is either added to or subtracted from the amplified received pulse of corresponding time delay, depending on the polarities of the pulses.

A suitable range unit is disclosed in an application of L. A. Meacham, Serial No. 491,791, filed June 22, 1943, which issued on June 17, 1947 as Patent 2,422,204, or in an article entitled "The SCR–584 Radar" in the February 1946 issue of "Electronics," beginning on page 110.

Reference will now be made to FIG. 2 which shows schematically that part of the optical system represented within the dashed lines in FIG. 1. For a better understanding of the relationship of the various elements, they have been shown in perspective. An image of the linear filament 12 is focussed by the lens system 11 upon the plane of the disc 13 which is rotating in the direction of the arrow. This disc has one or more slits 14. If a plurality of slits are used, they are symmetrically arranged if it is desired to have the pulses evenly spaced, but if it is desired to have an uneven arrangement of pulses the slits 14 are non-symmetrically positioned on the disc 13. By way of example, if two slits 14 are used they may be placed 150 degrees apart rather than in a symmetrical arrangement having 180 degrees separation; this non-symmetrical positioning produces an uneven arrangement of pulses with respect to time. The length and shape of the pulse of light produced on the side of the disc remote from the lamp 10 depends on the size of the image 30 of the wire filament 12, and the width of the slit 14 and the speed of the disc 13 are determined by the speed of the motor 31 driving it. Assuming even spacing of slits, the number of slits 14 in the rotating wheel 13 and the rotational speed of the wheel determine the frequency of pulsing.

The image 30 is made up of two parts, one displaced from the other. The main part 32 is an image of almost the full length of the filament 12 while the displaced part 33 is somewhat ahead of (that is, it is intercepted first by the approaching slit 14) the main portion 32 due to the deviating or refracting action of the prism 20.

The function of the weak glass prism 20 is illustrated in the diagram of FIG. 3. Prism 20 is introduced between the lens system 11 and the slit wheel 13 in such a manner as to intercept only the end portion of the rays entering into the formation of the filament image 30 in the plane of the slit wheel 13 to consequently displace a portion of this image laterally by reason of the refractive or deviating power of the prism 20. The amount of shift or deviation introduced can be expressed in terms of angle as approximately half of the interfacial angle of the prism. A 10-degree prism will therefore deviate a ray by approximately 5 degrees, always in the direction of the base or thick side of the prism. It is obvious that the rotating slit 14 will first intercept the displaced segment 33 of the filament image and will consequently pass light to the right angle reflecting prism 21 and phototube 22 on the side of the disc or wheel 13 remote from the lamp 10. The position of the prism 21 is so adjusted as to receive only that light which enters into the formation of the displaced image. Light in the undisplaced image 32 passes through the slit 14 at a later time, determined by the rotational speed of the slit and the amount of displacement of the displaced segment 33 of the image, and is transmitted by the transmitter projection lens 15 and the mirror 16 to the target 17, as above described, without passing through the prism 20.

For a fixed rotational speed of the slit wheel 13, it is obvious that the length of time by which the phototube response pulse will precede the main target pulse can be altered by changing the linear distance between the displaced segment 33 of the filament image 30 and the undisplaced portion 32 thereof. This can be effected by the choice of prism angle used or by movement of the prism either toward or away from the slit wheel 13. The closer the prism 20 is to the slit wheel 13, the smaller will be the linear displacement between the undisplaced and the displaced segments of the filament image 30. An increase of distance between the prism 20 and the slit wheel 13 causes an increase in distance between the two segments of the filament image 30 with consequent increase in the length of time by which the phototube 22 response anticipates the main target pulse. FIG. 3 shows a ray of light entering prism 20 in position A and deviated toward the prism base to the plane of the slit wheel 13 which it intersects at point C. If, however, the same prism is placed in position B (shown in dot-dash line in FIG. 3) the deviated ray will intercept the plane of the slit wheel at point D. The undeviated ray or main beam will, of course, intercept the plane of the slit wheel 13 at point O. Hence the length O—C represents one period of time by which the response of the phototube 22 will precede the main target pulse produced by the light passing through the lens 15 and reflected toward the target 17 by the mirror 16. The length O—D represents a second period of time in the same sense. If for any reason it is desired to have the response of the phototube 22 follow the main pulse instead of precede it, this can readily be done by a reversal of the direction of rotation of the slit wheel 13 or by reversal of the position of the deviating prism 20 (in the sense that it is turned through 180 degrees, as shown in FIG. 4). Here the displaced images lie at points C' and D' for prism positions A' and B'. The undeviated ray again intersects the plane of the disc 13 at O. The direction of rotation of the slit wheel 13 is assumed to remain the same as in the arrangement shown in FIG. 2. Thus it is readily possible to alter the value of the time element between the main pulse and the auxiliary or synchronizing pulse which precedes or follows it.

The time interval between the transmission of the main beam and the displaced segment of the image will also depend in a small degree upon the color sensitivity of the photocell used due to dispersion by the prism of the colors present in radiation from incandescent tungsten. A blue sensitive photocell will give a slightly greater time interval over that given by a red sensitive cell. The length of the short spectrum formed by a thin crown glass prism will be only $\frac{1}{60}$ of the shift of the image segment caused by its deviation. Since the amount of displacement can be readily changed by suitably positioning the prism relative to the rotating disc, any desired time interval can be secured with photocells having any of the usual types of color sensitivity.

The main ray passing through the slot 14 can be passed through a filter 40 if it is desired to remove all light components except the infra-red. The object locating and distance measuring system of this invention, however, can utilize directed light pulses in either the visible or invisible portions of the spectrum, although there are certain advantages, such as for secrecy, in using only infra-red radiation.

The light pulses reflected by the mirror 16 are directed toward the target 17 which preferably comprises a retrodirective reflector such as the well-known triple mirror device, the operation of which is disclosed in Patent 1,384,014 to Fessenden, issued July 5, 1921. The advantage of the retrodirective reflector is that it reflects back to the paraboloidal mirror 18 substantially all rays striking it. When a retrodirective reflector (or a plurality of them combined as a unit) is used, it stands out distinctly regardless of neighboring objects or background. While a retrodirective reflector of the type employing three reflecting surfaces mutually perpendicular to one another is to be preferred, the system of FIG. 1 is operative with other forms of targets, either good reflecting objects or diffusely reflecting objects.

The rays reflected back from the target 17 and picked up by the paraboloidal mirror 18 are focussed upon the photoelectric cathode 41 of the tube 19 which, for example, is a multistage caesium-oxide photomultiplier tube.

If infra-red radiations are used, this tube is constructed so that it is sensitive to infra-red. A photomultiplier system including the power supply therefor is shown in Patent 2,311,981 issued February 23, 1943 to Farnsworth.

The final anode 42 of the photomultiplier 19 is connected to the input circuit of the amplifier 29 which is of any suitable form for amplifying frequencies normally to be expected in signals of the character produced by the photomultiplier 19. The ungrounded terminal of the amplifier 29 is connected to one of the deflecting plates 28 while the other deflecting plate 28 is connected to the ungrounded terminal of the range unit 27. This causes the deflecting signal applied to the plate 28 to be an instantaneous sum or difference of the range mark pulse produced by the range unit 27 and the video output signal of the amplifier 29. When the oscilloscope shows a registry of the range mark pulse 70 and the amplified received echo pulse 71 (as indicated in FIG. 6), a reading of the range unit 27 shows the range to the target. The sweep voltage to produce the horizontal deflection of the beam is produced by the sweep voltage generator 24. In practice, it is desirable to have the synchronizing pulse which actuates the sweep circuit 24 occur slightly ahead of the outgoing light pulse in order that the initial or transmitted light pulse can be seen on the cathode ray tube 23 as a "zero distance" mark 72 on the range scale. Some of the light from the main beam 50 can be deviated to a photocell (not shown) to produce a pulse corresponding to the mark 72. It will be obvious that the various pieces of equipment including the prisms 20 and 21 and the photoelectric cell 22 cooperate to produce an electrical pulse which is ahead of the outgoing pulse represented by the dot-dash line 50 in FIG. 1, and shown as mark 72 on the oscilloscope screen. For further details on the advantages of and the method of operation of an "irrad" system, reference should be made to the above-identified Bruce application.

A modification of the arrangement of FIG. 1 is shown in FIG. 5 wherein parts or elements having the same functions as corresponding parts in the arrangement of FIG. 1 have been given the same reference characters. FIG. 5 shows only a portion of the complete system, the rest of the system being like that shown in FIG. 1. The portion of the system shown in FIG. 5 differs from the corresponding portion of the arrangement of FIG. 1 in the addition of a second weak prism 60 whose base is turned through 180 degrees with respect to the base of the prism 20, a second right angle prism 61 which is similar to the prism 21, and a photocell 62 which can be similar to the photocell 22 if desired. By making use of a plurality of weak prisms, such as prisms 20 and 60, it is possible to secure more than one pulse for synchronizing purposes. In the arrangement of FIG. 5, the pulse produced by the photocell 22 leads the main pulse and that produced by the phototube 62 follows the main pulse. By proper placing of the prisms 20 and 60 there can be two early pulses (prepulses) or two late pulses (post-pulses) or one early and one late pulse depending on the orientation of the prism bases. Furthermore, the deviating powers of the weak prisms may be unequal or equal thus causing unequal or equal time intervals between the deviated light pulses and the main pulse.

By means of a proper switching system (not shown for simplicity in the drawings) the pulse of the tube 22 or that of the tube 62 can be used to initiate the operation of range unit 27 and synchronize the operation of the sweep and beam brightening voltage generator 24. If desired, the prepulse may be used to actuate the sweep and beam brightening voltage generator 24 and the post-pulse may be used to start the operation of the range unit.

Various modifications can be made in the embodiment described above without departing from the spirit of the invention, the scope of which is indicated in the claims.

What is claimed is:
1. In combination, means for generating a main beam of light, a movable member positioned in the path of said beam for periodically transmitting light therefrom in pulse form, means for producing from said beam a smaller light beam which is displaced with respect to said main beam to such an extent and position that said movable member periodically transmits the pulse of light from said smaller beam ahead of each pulse of said main beam, and means for utilizing said pulses of light from said smaller beam to control apparatus utilizing said pulses from said main beam.

2. In combination, means for generating a beam of light including infra-red and other radiation, a movable member positioned in the path of said beam for periodically transmitting light therefrom in pulse form, means for producing from said first beam a smaller beam which is displaced with respect to said first beam to such an extent and position that said movable member periodically transmits a pulse of light from said smaller beam ahead of each pulse from said first or main beam, means for filtering said main beam to pass only infra-red radiations, and means for utilizing said pulses of light from said smaller beam to control apparatus utilizing said pulses from said first beam.

3. In combination, means for producing and directing toward a target electromagnetic pulses falling within the range of infra-red, visible or ultra-violet wavelength bands, wave collecting means for receiving echoes or reflections from said target, wave sensitive electric means upon which said echoes or reflections are directed by said collecting means for producing electric pulses corresponding to said received reflections, means for utilizing said electric pulses to produce an indication of distance and direction of said target, optical means for producing a second series of electromagnetic pulses individual ones of which are time displaced with respect to those in the first series of electromagnetic pulses, means for producing from said second series of pulses a series of electric pulses, and means for utilizing said last-mentioned electric pulses to control said means for utilizing said first electric pulses.

4. In combination, means for generating a main beam of light, a rotating disc having a slit therein positioned in the path of said main beam for periodically transmitting light therefrom in pulse form, means for producing from said beam a smaller light beam which is displaced with respect to said main beam to such an extent and position that said movable member periodically transmits the pulse of light from said smaller beam ahead of each pulse of said main beam, and means for utilizing said pulses of light from said smaller beam to control apparatus utilizing said pulses from said main beam.

5. The combination of elements of claim 4 in which said means for producing the smaller beam comprises a prism mounted in the path of said main beam of light at the edge thereof and which displaces a small portion of said main beam so that said small portion passes through said slit in said disc ahead of the light from said main beam.

6. In combination, a lamp having a linear filament therein for continuously emitting light, a rotating disc having a slit therein, means for forming an image of the filament of said lamp upon the plane of said disc, and a prism for displacing a portion of said image whereby light from the displaced portion of the image passes through said slit prior to the undisplaced portion of said main image.

7. In combination, a lamp having a linear filament therein for continuously emitting light, a rotating disc having a slit therein, means for forming an image of the filament of said lamp upon the plane of said disc, and a prism for displacing a portion of said image whereby light from the displaced portion of the image passes through said slit behind the undisplaced portion of said image.

8. In combination, a lamp having a linear filament therein for continuously emitting light, a rotating disc having a slit therein, means for forming an image of the filament of said lamp upon the plane of said disc, and a prism for displacing a small portion of said image whereby light from the displaced portion of the image passes through said slit at a different time than the main portion of said image.

9. In combination, a lamp having a linear filament therein for continuously emitting light, a rotating disc having a slit therein, means for forming an image of the filament of said lamp upon the plane of said disc, a prism for displacing a small portion of said image whereby light from the displaced portion of the image passes through said slit at a different time than the main portion of said image, and a photocell for picking up the displaced portion of said image after it passes through said slit for producing therefrom an electric pulse.

10. In combination, a lamp having a linear filament therein for continuously emitting light, a rotating disc having a slit therein, means for forming an image of the filament of said lamp upon the plane of said disc, a prism for displacing a small portion of said image whereby light from the displaced portion of the image passes through said slit at a different time than the main portion of said image, and a photocell for picking up the displaced portion of said image after it passes through said slit and for producing therefrom an electric pulse.

References Cited in the file of this patent

UNITED STATES PATENTS

| | | |
|---|---|---|
| 914,282 | Ives | Mar. 2, 1909 |
| 2,237,193 | Mobsby | Apr. 1, 1941 |